US010180134B1

(12) United States Patent
Tanju et al.

(10) Patent No.: US 10,180,134 B1
(45) Date of Patent: Jan. 15, 2019

(54) SYSTEMS AND METHODS FOR CONTROLLING MULTI-CHAMBER SUBSEA PUMPS

(71) Applicant: Chevron U.S.A. Inc., San Ramon, CA (US)

(72) Inventors: Baha T. Tanju, Katy, TX (US); Michael B. Gerdes, Houston, TX (US); Dale Garth Straub, Bellaire, TX (US); Sharifur Rahman, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 18 days.

(21) Appl. No.: 15/640,641

(22) Filed: Jul. 3, 2017

(51) Int. Cl.
| | | |
|---|---|---|
| *F04B 43/06* | (2006.01) | |
| *F04B 49/06* | (2006.01) | |
| *F04B 43/02* | (2006.01) | |
| *F04B 1/00* | (2006.01) | |
| *F04B 49/22* | (2006.01) | |
| *F04B 43/073* | (2006.01) | |
| *F04B 9/08* | (2006.01) | |
| *E21B 21/00* | (2006.01) | |
| *E21B 43/12* | (2006.01) | |
| *G05D 7/06* | (2006.01) | |

(52) U.S. Cl.
CPC .......... *F04B 49/065* (2013.01); *E21B 21/001* (2013.01); *E21B 43/129* (2013.01); *F04B 1/00* (2013.01); *F04B 9/08* (2013.01); *F04B 43/026* (2013.01); *F04B 43/0736* (2013.01); *F04B 49/22* (2013.01); *G05D 7/0623* (2013.01); *F04B 2203/09* (2013.01); *F04B 2205/02* (2013.01); *F04B 2205/09* (2013.01)

(58) Field of Classification Search
CPC .. F04B 43/026; F04B 43/0736; F04B 49/065; F04B 49/22; F04B 1/00; F04B 9/08
See application file for complete search history.

(56) References Cited

U.S. PATENT DOCUMENTS

| | | | |
|---|---|---|---|
| 4,242,057 A | 12/1980 | Bender | |
| 5,213,485 A | 5/1993 | Wilden | |
| 6,325,159 B1 | 12/2001 | Peterman et al. | |
| 6,505,691 B2 | 1/2003 | Judge et al. | |
| 6,904,982 B2 | 6/2005 | Judge et al. | |
| 2004/0167726 A1* | 8/2004 | Rouss | F15B 19/007 702/50 |
| 2010/0046316 A1* | 2/2010 | Hughes | E21B 43/267 366/8 |

* cited by examiner

*Primary Examiner* — Mohammad Ali
*Assistant Examiner* — Vincent W Chang
(74) *Attorney, Agent, or Firm* — Karen R. DiDomenicis

(57) ABSTRACT

Methods and systems for controlling the timing of a fluid driven positive displacement pump (FDPDP) are disclosed using pump inlet pressure, flow rate and time domain control. Pressure is thus controlled at various flow rates of fluids to be pumped in subsea environments. The FDPDP includes a plurality of pressure vessels connected by piping, each vessel having two chambers. One chamber is connected to a source of fluid to be pumped and the other chamber is connected to a source of driving fluid. The methods synchronize pumping chambers that have no mechanical means to control timing between each pumping chamber. The control methods described utilize algorithms which receive feedback from the pumping system to control the pumping sequence and adapt to any parameter changes to maintain a constant range of desired pressure.

19 Claims, 9 Drawing Sheets

SYSTEMS AND METHODS FOR CONTROLLING MULTI-CHAMBER SUBSEA PUMPS

TECHNICAL FIELD

The present disclosure relates generally to the operation of fluid driven positive displacement pumps in subsea operations, and more particularly to control methods for operating such pumps.

BACKGROUND

Positive displacement pumps have a suction side or chamber into which fluid flows and a discharge side or chamber out of which fluid is expelled. The overall volume in the positive displacement pump is constant, while the volumes of the suction side and the discharge side have an inverse relationship with respect to one another. One example of a positive displacement pump is a diaphragm pump, also referred to as a membrane pump, that uses the reciprocating action of a flexible diaphragm (e.g., an elastomeric membrane) and suitable valves on either side of the diaphragm to pump the fluid. The diaphragm is sealed such that one side of the pump receives and discharges the fluid to be pumped, e.g., a liquid, gas, multiphase fluid or slurry, and the other side of the pump receives and discharges a second fluid referred to as the driving fluid. The flexing of the diaphragm causes the volume of the chambers to increase and decrease. As the volume of a chamber increases, pressure in the chamber decreases and fluid is drawn in. As the volume of the chamber decreases, pressure in the chamber increases and fluid is forced out. Check valves are used to prevent reverse flow of the fluid.

Another example of a positive displacement pump is a reciprocating type piston pump that uses the reciprocating action of a piston to similarly receive and discharge fluid.

Positive displacement pumps are known for use in subsea pumping operations, e.g., for pumping drilling fluids, production fluids and slurries. In conventional deepwater drilling, drilling operators work through a blowout preventer at the sea floor to drill deepwater wells within a steel riser extending from a drillship. Drilling mud is pumped down a rotating drill pipe to lubricate the drill bit and carry the rock cuttings back up to the drillship within the riser. The drilling mud's weight causes the riser's inside pressure can be nearly twice that of the deep ocean. In subsea mudlift drilling (SMD), drilling mud flows downwards inside the rotating drill pipe to the drill bit, while a seawater-powered fluid driven positive displacement pump (FDPDP) above the blowout preventer (BOP) circulates drilling mud, also referred to as mud, and cuttings back to the drillship through a pipe outside the riser. The riser is filled with a seawater-like fluid, drilling mud or well bore fluid of similar density so the riser pressure adjusted to accommodate the challenge of dealing with fluctuating pressures from the fields under the sea floor. The main goal of the FDPDP is to regulate the mudline mud pressure such that bottom-hole pressure stays within the desired drilling pressure window, i.e., between the formation pore pressure and the formation fracture pressure.

The FDPDP is specially designed for this application. The FDPDP returns mud at the mudline via a separate path outside the drill pipe therefore lowering and/or eliminating mud-return riser friction and mud hydrostatic pressure to regulate downhole pressure, i.e., at downhole location, also referred to as bottom hole pressure (BHP), during drilling conditions to stay within the desired drilling pressure window. The drillship sends seawater down a pipe via a seawater pump to the FDPDP, also referred to as the pump, where it pulses over a diaphragm in the pump vessel, pushing the mud back up its own pipe to the drillship. The seawater, endless in supply and harmless to the environment, is discharged back to the sea, controlled by a fill choke. The pump can be designed to be installed on the drilling stack. The operation seawater depth can range between 4,000 ft and 10,000 ft. This pressure can be much lower than the mudline shut in pressure due to the mud weight. The fluid driven positive displacement pump typically includes a plurality of pressure vessels connected in parallel, each pressure vessel having a first and a second chamber separated by a diaphragm or a piston.

U.S. Pat. No. 6,505,691, entitled Subsea Mud Pump and Control System (Judge et al.), discloses a subsea pump having a plurality of pressure vessels each having two chambers with a separating diaphragm between the chambers. Each of the two chambers is hydraulically connected to receive and discharge a hydraulic fluid and a drilling fluid, respectively. The diaphragm moves in response to a pressure differential between the chambers. A hydraulic power supply is arranged to pump the hydraulic fluid to one chamber of each pressure vessel. A valve assembly is coupled to these chambers and to the hydraulic power supply. The volume of each of the chambers is measured. A valve controller connected to the valve assembly is arranged to control the rate and timing of the flow of the hydraulic fluid into and out of the chambers in response to the volume measurements. The valve controller is configured to approximate a substantially constant pump inlet pressure, a substantially constant pump discharge pressure, and/or a substantially constant volume of the first chambers.

The current method to control the timing of positive displacement pumps is the use of valve controllers with control software. The software is configured using pumping events and timers, based on empirical data, and then tuned to adjust to specific parameter changes. Thus, the control is set up empirically based on estimated conditions at a given point in time, and not in an adaptive manner. Any changes require manually changing the control software tuning parameters that control the pump hardware. Thus, current methods are not able to achieve constant pressure at varying operational conditions.

Maintaining a substantially constant pump inlet pressure is important to help ensure stable pressure within an operating window. In the example of subsea pumping of drilling fluid, a BHP that is above the operating window may result in fracturing of the formation. A BHP that is below the operating window may result in a collapse of the well or influx from the wellbore if BHP as there is no casing in place yet, depending on the formation pressure. Mud having a target mud weight is pumped by the FDPDP to regulate the BHP. Current control schemes for controlling the FDPDP are not able to adequately achieve the target operating window within a consistent, narrow range of error. Thus, there are large variations and spikes in FDPDP inlet pressure and therefore also BHP. This further has the overall effect of slowing drilling since changes in pump speed are made very gradually.

It would be desirable to have a simpler, more adaptive and more reliable method for controlling fluid driven positive displacement pumps during subsea pumping operation that would avoid the aforementioned problems.

SUMMARY

In general, in one aspect, the disclosure relates to a method for controlling a subsea fluid driven positive displacement pump in a subsea pumping operation by regulating a pump inlet pressure or a pump inlet flow rate. The method includes providing in a subsea environment at least one fluid driven positive displacement pump (FDPDP). The FDPDP includes a plurality of pressure vessels connected in parallel wherein each pressure vessel has a first and a second chamber separated by a diaphragm or a piston therein. The first chamber of each pressure vessel is connected to a source of fluid to be pumped from a first location to a second location. A pump inlet conduit connects the first chamber of each of the pressure vessels to the source of fluid to be pumped. A first and a second valve control flow of the fluid to be pumped into and out of the first chamber of each pressure vessel, respectively. A third and a fourth valve control flow of a driving fluid into and out of the second chamber of each pressure vessel, respectively. At least one sensor is coupled to each of the pressure vessels, i.e., a pressure transducer coupled to the pump inlet conduit for monitoring pump inlet pressure or a flow meter for determining a pump inlet flow rate of the fluid to be pumped to the pressure vessels. At least one fill choke is in a first driving fluid conduit between the third valve for controlling flow of the driving fluid into and out of the second chamber of each pressure vessel and a driving fluid outlet. The method includes monitoring the pump inlet pressure and/or the pump inlet flow rate of the fluid to be pumped to the pressure vessels via the at least one sensor during the subsea pumping operation. Next, a form of a basic liquid flow control equation $Q=Cvf \times \sqrt{(\Delta P/S.G.)}$ is solved for a target flow coefficient Cvf of the at least one fill choke using periodic measurements by the at least one sensor, wherein Q is a flow of the fluid to be pumped through the pump inlet conduit, $\Delta P$ is a differential pressure across the at least one fill choke, and S.G. is a specific gravity of the driving fluid. Q is assumed to be substantially constant between successive measurements taken by the at least one sensor. The fill choke position is adjusted to achieve the target flow coefficient Cvf, thereby regulating the pump inlet pressure or the pump inlet flow rate of the fluid to be pumped to the pressure vessels through the pump inlet conduit.

In another aspect, the disclosure can generally relate to a method for controlling a fluid driven positive displacement pump in a subsea pumping operation by regulating a pump fill sequence. The method includes providing in a subsea environment at least one FDPDP as described above and further including at least one diaphragm or piston location sensor for determining a fill volume of fluid to be pumped within each of the pressure vessels. The method includes monitoring a fill volume $Vf_n$ of fluid within each of the pressure vessels via the at least one diaphragm or piston location sensor during the operation such that periodic $Vf_n$ measurements are measured every n unit of time. An equation $Vf_{target}=Vf_{mid}-(Vf_{min}-Vf_{start})/2$ is solved for a target fill volume $Vf_{target}$ of fluid to be pumped within each of the pressure vessels, wherein $Vf_{mid}$ and $Vf_{min}$ are known for each pressure vessel and $Vf_{start}$ is a starting fill volume of fluid to be pumped within each of the pressure vessels as measured by the at least one diaphragm or piston location sensor. An equation $dt=(Vf_{target}-Vf_{start}) \times (t_n-t_{n-1})/(Vf_n-Vf_{n-1})$ is solved for dt using calculated $Vf_{target}$, $Vf_{start}$, and periodic $Vf_n$ and $Vf_{n-1}$ measurements and associated time values $t_n$ and $t_{n-1}$, respectively, wherein dt represents the duration of ⅙ of a complete cycle including (1) starting to fill, (2) finishing filling, (3) transferring from filling to pumping, (4) starting to pump, (5) finishing pumping and (6) transferring from pumping to filling for each pressure vessel. dt is an amount of time in seconds. dt can be a duration of at least 2 seconds. The opening and closing of the first and second valves for controlling flow of fluid to be pumped into and out of the first chamber of each pressure vessel and the third and fourth valves for controlling flow of driving fluid into and out of the second chamber of each pressure vessel is sequenced based on the calculated dt to fill and pump out the first chamber of each pressure vessel. The first chamber of each pressure vessel fills for 2×dt, transfers from filling to pumping for 1×dt, pumps out for 2×dt and transfers from pumping to filling for 1×dt during in the complete fill-transfer-pump-transfer cycle, thereby providing precise pump fill volume control without the use of a PID calculation method.

In yet another aspect, the disclosure can generally relate to a system for controlling a FDPDP in a subsea pumping operation by regulating a fluid pump inlet pressure or a fluid pump inlet flow rate. The system includes at least one FDPDP as described above for location in a subsea environment, and a controller coupled to the at least one sensor and the at least one fill choke. The controller solves a form of a basic liquid flow control equation $Q=Cvf \times \sqrt{(\Delta P/S.G.)}$ for a target flow coefficient Cvf of the at least one fill choke using periodic measurements by the at least one sensor. The fill choke position is modified based on the solved Cvf, thereby regulating the pump inlet pressure or the pump inlet flow rate of fluid to be pumped to the pressure vessels through the fluid pump inlet conduit.

In yet another aspect, the disclosure can generally relate to a system for controlling a FDPDP in a subsea pumping operation by regulating a pump fill sequence. The FDPDP has a plurality of pressure vessels connected in parallel wherein each pressure vessel has a first and a second chamber separated by a diaphragm or a piston therein and wherein the first chamber of each pressure vessel is connected to a source of fluid to be pumped from a first location to a second location. A pump inlet conduit connects the first chamber of each of the pressure vessels to the source of fluid to be pumped. A first and a second valve control flow of the fluid to be pumped into and out of the first chamber of each pressure vessel, respectively. A third and a fourth valve control flow of a driving fluid into and out of the second chamber of each pressure vessel, respectively. At least one sensor is coupled to each of the pressure vessels, i.e., a pressure transducer coupled to the pump inlet conduit for monitoring pump inlet pressure or a flow meter for determining a pump inlet flow rate of the fluid to be pumped to the pressure vessels. At least one fill choke is in a first driving fluid conduit between the third valve for controlling flow of the driving fluid into and out of the second chamber of each pressure vessel and a driving fluid outlet. At least one diaphragm or piston location sensor monitors a fill volume $Vf_n$ of the fluid to be pumped within the actively filling first chamber at the given time during the subsea pumping operation such that periodic $Vf_n$ measurements are measured every n unit of time. The system further includes a means for solving an equation $Vf_{target}=Vf_{mid}-(Vf_{min} Vf_{start})/2$ for a target fill volume $Vf_{target}$ of the fluid to be pumped within the actively filling first chamber, wherein $Vf_{mid}$ and $Vf_{min}$ are known for the actively filling first chamber and $Vf_{start}$ is a starting fill volume of the fluid to be pumped within the actively filling first chamber as measured by the at least one diaphragm or piston location sensor at the given time. The system further includes a means for solving an equation $dt=(Vf_{target}-Vf_{start}) \times (t_n-t_{n-1})/(Vf_n-Vf_{n-1})$ for dt using calculated $Vf_{target}$, $Vf_{start}$, and periodic $Vf_n$ and $Vf_{n-1}$ measurements and associated time values $t_n$ and $t_{n-1}$, respectively, wherein dt represents the duration of ⅙ of a complete cycle including (1) starting to fill, (2) finishing filling, (3) transferring from filling to pumping, (4) starting to pump, (5) finishing pumping and (6) transferring from pumping to filling for each pressure vessel. The system further includes a means for opening and closing the first and second valves for controlling flow of the fluid to be pumped into and out of the first chamber of each pressure vessel and the third and fourth valves for controlling flow of the driving fluid into and out of the second chamber of each pressure vessel based on the calculated dt to fill and pump out the first chamber of each pressure vessel; wherein the first chamber of each pressure vessel fills for 2×dt, holds for 1×dt during transfer from filling to pumping, pumps out for 2×dt and holds for 1×dt during transfer from pumping to filling in a complete fill-transfer-pump-transfer cycle; thereby providing precise fill volume control without the use of a PID calculation method.

These and other aspects, objects, features, and embodiments will be apparent from the following description and the appended claims.

BRIEF DESCRIPTION OF THE DRAWINGS

The drawings illustrate only example embodiments of methods, systems, and devices for subsea pumping. Example embodiments described herein are not to be considered limiting of its scope. This is similarly applied to drawings illustrating any systems described herein. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
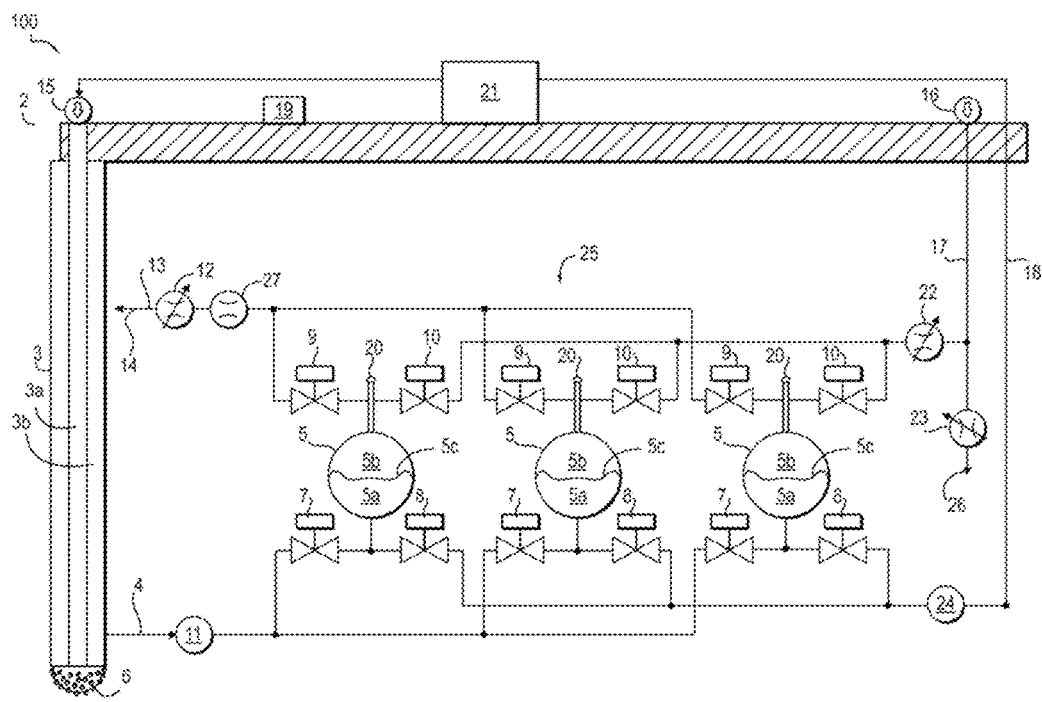
FIG. 1 shows a schematic diagram of a field system in which example embodiments can be applied.

The example embodiments discussed herein are directed to systems and methods of operating and controlling fluid driven positive displacement pumps (FDPDPs) in subsea operations. Disclosed are methods for the control of a subsea positive displacement pump used to maintain a constant range of pressure at various operational conditions such as flow rates for use with pumping of drilling fluids, production fluids, and other slurries. The methods apply to subsea positive displacement pumps that require synchronization of filling and pumping of fluid into and out of the pump chambers, respectively, that have no mechanical means to control timing of the filling and pumping. Unlike current control methods that require configuration of control software using pumping events and timers based on empirical data, and then manually tuned to adjust for specific parameter changes, the control methods described herein utilize algorithms which receive feedback from the pumping system to control the pumping sequence and adapt to any parameter changes to maintain a constant range of desired pressure.

In one embodiment, FDPDPs are positive displacement pumps driven by a high bulk modulus driving fluid, therefore the FDPDP utilizes valve timing, interflow (i.e., carry-over flow between chambers in a multi-chamber pump when transitioning from filling to pumping and vice versa), and an increased number of pumping chambers to deal with fluid transients. Usually a diaphragm pump contains two chambers to ensure pumping continuity. The two chambers are physically connected to each other such that while one chamber is pumping out, the other chamber fills with the pumped fluid. In the case of FDPDPs, the control system adaptively controls the fill choke positions to balance the pumped fluid (e.g., drilling mud in one embodiment in a drilling operation) and driving fluid (e.g., seawater in one embodiment in a drilling operation) volumes within the FDPDP chambers. A diaphragm pump utilizes a pressure regulator at the driving fluid side to regulate the pump flowrate. The FDPDP uses a fill choke to regulate the incoming flowrate, and dump and pump chokes to regulate the outgoing flowrate. The chokes constantly balance the incoming and outgoing flowrates to ensure all filled fluid is pumped out. When a diaphragm pump is considered at a high level, it appears to have two discrete sequences, filling and pumping. However, when considered more closely, there is a minute amount of time spent to divert pumped fluid and the driving fluid from one chamber to the other and move check valves, referred to as "transfer time." Together with the diverting fluids and the check valve movements, a diaphragm pump has four discrete sequences in a cycle, i.e., fill, fill-pump transfer, pump, and pump-fill transfer. The FDPDP utilizes plunger type valves to divert fluids; therefore, the sequences in between filling and pumping sequences, i.e., the transition times, take much longer time to execute. Due to the low bulk modulus of the driving fluid and very short transfer time, a diaphragm pump can tolerate very short interruptions of flow during diverting fluids. By contrast, the FDPDP cannot tolerate these fluid transients (i.e., water hammers). The pumped and driving fluids' flow needs to be continuous. Consequently, the FDPDP needs to have a minimum of three vessels to address the fluid transfer transients.

A "user" as described herein may be any person that is involved with operating and controlling fluid driven positive displacement pumps (FDPDPs). Examples of a user may include, but are not limited to, a company representative, a drilling engineer, a production engineer, a field engineer, an operator, a consultant, a contractor, and a manufacturer's representative. The systems for controlling fluid driven positive displacement pumps (including any components thereof) described herein can be made of one or more of a number of suitable materials to allow the systems to maintain reliable and effective operations, meet certain standards and/or regulations, and also maintain durability in light of the conditions (e.g., marine, high pressure, high temperature, subterranean) under which the systems can be exposed and/or operate under.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In the foregoing figures showing example embodiments of systems for controlling fluid driven positive displacement pumps, one or more of the components shown may be omitted, repeated, and/or substituted. Accordingly, example embodiments of systems for controlling fluid driven positive displacement pumps should not be considered limited to the specific arrangements of components shown in any of the figures. For example, features shown in one or more figures or described with respect to one embodiment can be applied to another embodiment associated with a different figure or description.

Example embodiments of systems for controlling fluid driven positive displacement pumps are described more fully hereinafter with reference to the accompanying drawings, in which example embodiments of systems for controlling fluid driven positive displacement pumps are shown. Systems for controlling fluid driven positive displacement pumps may, however, be embodied in many different forms and should not be construed as limited to the example embodiments set forth herein. Rather, these example embodiments are provided so that this disclosure will be thorough and complete, and will fully convey the scope of systems for controlling fluid driven positive displacement pumps to those of ordinary skill in the art. Like, but not necessarily the same, elements (also sometimes called components) in the various figures are denoted by like reference numerals for consistency.

Terms such as "first," "second," "top," "bottom," "proximal," "distal," "inner," "outer," "front," "rear," and "side" are used merely to distinguish one component (or part of a component) from another. Such terms are not meant to denote a preference or a particular orientation, and are not meant to limit embodiments of systems for controlling fluid driven positive displacement pumps. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In one embodiment, the FDPDP is used to pump drilling fluid also referred to as "mud" in subsea mudlift operations. The driving fluid can be seawater. The FDPDP pumped drilling fluid contains solids. For that reason, using check valves as in diaphragm pumps is not possible. Special plunger type valves are used to deal with the solids in the pumped fluid, requiring precise control of the valves in the FDPDP.

For purposes of illustrating the operation of the systems and methods of the disclosure, the systems and methods will be described with respect to subsea mud lift drilling in which the FDPDP is used to pump drilling fluid. The same systems and methods described with respect to subsea mud lift drilling operations can be employed when the FDPDP is used to pump production fluids in subsea oil and gas production, subsea injection of produced water into reservoirs, and subsea pumping of slurries, e.g., in seafloor mining operations.

FIG. 1 shows a schematic diagram of a field system 100 in which example embodiments can be applied including a drill pipe 3 extending from a drillship 2 into a subterranean formation. A drill bit 6 at the end of the drill string 3a creates the wellbore such that the drill bit 6 is located at the bottom of the wellbore. In one or more embodiments, one or more of the features shown in FIG. 1 may be omitted, added, repeated, and/or substituted. Accordingly, embodiments of a field system should not be considered limited to the specific arrangements of components shown in FIG. 1.

Referring to FIG. 1, a triplex FDPDP 25 is shown located on a seafloor. The triplex FDPDP 25 includes three pressure vessels 5 connected in parallel with associated piping. It is to be understood that a plurality of triplex FDPDPs 25 is connected with associated piping. Each pressure vessel 5 returns mud at the mudline via a path separate and outside the drill string 3a, thereby lowering and/or eliminating mud-return riser friction and mud hydrostatic pressure to regulate downhole pressure, i.e., at the downhole location of the drill bit 6, also referred to as bottom hole pressure (BHP). Thus, during drilling, the BHP can be regulated to stay within the desired drilling pressure window. In one embodiment, a control method for a FDPDP 25 on a seafloor in a subsea mudlift drilling operation regulates a drilling fluid pump inlet pressure or a drilling fluid pump inlet flow rate. Each of the plurality of pressure vessels 5 has a first chamber 5a, also referred to as a mud side chamber 5a, and a second chamber 5b also referred to as a seawater side chamber 5b, separated by a diaphragm (also referred to as a membrane) 5c therein. Examples of such pressure vessels 5 are described in U.S. Patent Pub. No. 20150240578A1. Alternatively, the pressure vessels 5 include a piston (not shown) between the first and second chambers 5a and 5b. The mud side chamber 5a of each pressure vessel 5 is connected to a drill pipe annulus 3b in drill pipe 3 in which drilling fluid is returned from the downhole location 6 to a surface location 2 (i.e., the drillship). A drilling fluid pump inlet conduit 4 connects the mud side chamber 5a of each of the pressure vessels 5 to the drill pipe annulus 3b.

In one embodiment, four valves are associated with each vessel 5. First and second valves 7 and 8, respectively, control flow of drilling fluid into and out of the mud side chamber 5a of each pressure vessel 5. One of the first valves 7 is located in the drilling fluid pump inlet conduit 4 between the drill pipe annulus 3b and the drilling fluid side or the mud side of the FDPDP 25 i.e., the side of each of the pressure vessels 5 in fluid communication with drilling mud (in communication with the first chambers 5a). The second valves 8 are located in drilling fluid conduits in fluid communication with conduit 18 between the surface location 2 and the mud side of the FDPDP 25.

Third and fourth valves 9 and 10, respectively, control flow of seawater into and out of the second chamber 5b of each pressure vessel 5. One of the third valves 9 is located in a first seawater conduit 13 between the second chamber 5b and a seawater outlet 14 open to a sea or ocean environment. The fourth valves 10 are located in seawater conduits in fluid communication with a second seawater conduit 17 between the driving fluid (seawater) side of the FDPDP 25 (in communication with the second chambers 5b) and a surface seawater pump 16.

In one embodiment, a seawater pump 16 on the drillship 2 pumps seawater down a seawater pipe 17 to the seawater side of the FDPDP 25, where it pulses over diaphragms 5c in the pressure vessels 5. The seawater, endless in supply and harmless to the environment, is discharged back to the sea through the seawater outlet 14 in first seawater conduit 13. The pulsing over the diaphragms 5c in the pressure vessels 5 forces or pushes the mud back up mud pipe 18 to the drillship 2. The mud pipe 18 returns mud to a separator 21 on the drillship 2 where the mud is cleaned before recirculating the mud by returning the mud to pump 15.

The mud pump 15 can optionally be designed to be installed on the drilling stack (not shown). The operation seawater depth can range, for example, between 3,000 ft and 10,000 ft or higher, e.g., between 3,000 ft and 15,000 ft (4,470 psi or higher hydrostatic seawater pressure). The maximum operating pressure of mud and seawater systems can be 7000 psig, or even 10,000 psig. This pressure can be much lower than the mudline shut in pressure due to the mud weight.

In one embodiment, at least one sensor 11 is coupled to the mud side of the FDPDP 25, i.e., the side of each of the pressure vessels 5 in fluid communication with drilling mud. In one embodiment, the sensor 11 can be a pressure transducer coupled to the drilling fluid pump inlet conduit 4 for monitoring pump inlet pressure ($P_{inlet}$). In one embodiment, the sensor 11 can be a flow meter for determining a pump inlet flow rate of the drilling fluid to the pressure vessel 5. The sensor 11 can monitor the pump inlet pressure and/or the pump inlet flow rate of the drilling fluid to the pressure vessels 5 during the subsea fluid driven positive displacement drilling operation. In one embodiment, the pump inlet pressure and/or the pump inlet flow rate of the drilling fluid to the pressure vessel 5 is monitored via the at least one sensor 11 during the subsea fluid driven positive displacement drilling operation.

In one embodiment, at least one sensor 24 is coupled to the mud side of the FDPDP 25 for monitoring pump outlet pressure ($P_{outlet}$). The sensor 24 can be located in the mud pipe 18.

At least one fill choke 12 is located in the first seawater conduit 13 between the seawater side of the FDPDP 25 and a seawater outlet 14, for controlling the flow of seawater into and out of the driving fluid side (also referred to as the seawater side) of the FDPDP 25, i.e., the side of the pressure vessels 5 in fluid communication with the driving fluid (seawater). The side of each of the pressure vessels 5 in fluid communication with the driving fluid is the second chamber 5b of each pressure vessel 5. The fill choke 12 has an adjustable choke position to control flow of seawater therethrough.

At least one pump choke 22 is located between the surface seawater pump 16 and the seawater side of the FDPDP 25 for controlling the flow of seawater on the driving fluid side of the FDPDP 25. The pump choke 22 has an adjustable choke position to control flow of seawater therethrough. The pump choke 22 is used to control supply of seawater to the FDPDP 25.

A dump choke 23 is located in fluid communication with the surface seawater pump 16 and the seawater pipe 17 for controlling the flow of seawater out of the driving fluid side of the FDPDP 25 through a seawater outlet 26. The dump choke 23 is used to "dump" seawater from the FDPDP 25 into the sea. As shown, the pump choke 22 is located between the dump choke 23 and the seawater pipe 17, and the dump choke 23 is located between the pump choke 22 and the seawater outlet 26.

In one embodiment, a form of a basic liquid flow control equation $Q=Cvf \times \sqrt{(\Delta P/S.G.)}$ is solved for a target flow coefficient Cvf of the fill choke 12 using periodic measurements by the at least one sensor 11. Q is the flow rate of the drilling fluid through the drilling fluid pump inlet conduit 4. $\Delta P$ is the differential pressure across the fill choke 12. S.G. is the specific gravity of the seawater.

In one embodiment, the flow rate Q is assumed to be substantially constant between successive measurements taken by the at least one sensor 11. The flow rate Q can be assumed to be substantially constant between successive measurements taken by the at least one sensor 11 when the frequency of the measurements is set such that very little time ($\Delta t$) elapses between measurements. For example, readings or measurements taken by the at least one sensor 11 can be taken every 50 ms or less, even from 10 ms to 50 ms ($\Delta t$).

The fill choke 12 position can be adjusted to achieve the target flow coefficient Cvf to regulate the pump inlet pressure or the pump inlet flow rate of drilling fluid to the pressure vessels 5 of the FDPDP 25 through the drilling fluid pump inlet conduit 4. As the flow Q changes over time, this can be accounted for by including a term to represent the flow rate change.

In one embodiment, the sensor 11 coupled to each of the pressure vessels 5 is at least one pressure transducer coupled to the pump inlet 4. The pressure transducer 11 monitors pump inlet pressure. In one embodiment, the basic liquid flow control equation is in the form $Cvf=Cvf_n \times \sqrt{P_{inlet}}/\sqrt{P_{target}}$ for Cvf; wherein:

$P_{target}$ is given;

$Cvf_n$ is read from the at least one fill choke 12; and $P_{inlet}$ is measured periodically by the at least one pressure transducer 11.

The fill choke position is modified based on the solved Cvf, thereby regulating the pump inlet pressure.

In one embodiment, the at least one sensor 11 coupled to each of the pressure vessels 5 is a diaphragm sensor for determining the volume of drilling fluid within the pressure vessels 5. Alternatively, when the pressure vessels 5 include a piston (not shown), the at least one sensor 11 coupled to each of the pressure vessels 5 is a piston location sensor (not shown) for determining the volume of drilling fluid within the pressure vessels 5. In one embodiment, the form of basic liquid flow control equation is $Cvf=Cvf_n \times Q_{target}/Q_n$ for Cvf; wherein:

$Q_{target}$ is given;

$Cvf_n$ is read from the fill choke; and $Q_n$ is measured periodically by at least one flow meter.

The fill choke position is modified based on the solved Cvf, thereby regulating the pump inlet flow rate.

In one embodiment, a system for controlling a fluid driven positive displacement pump by regulating a fluid pump inlet pressure or a fluid pump inlet flow rate further includes a controller 19 coupled to the at least one sensor 11 and the at least one fill choke 12 (electrical connections not shown). As shown, the fluid can be drilling fluid in subsea mudlift drilling operations. The controller 19 solves a form of basic liquid flow control equation $Q=Cvf \times \sqrt{(\Delta P/S.G.)}$ for the target flow coefficient Cvf of the at least one fill choke 12 as described above. The controller 19 modifies the fill choke 12 position based on the solved Cvf, thereby regulating the pump inlet pressure or the pump inlet flow rate of drilling fluid to the pressure vessels through the drilling fluid pump inlet conduit 4.

In one embodiment, a control method suitable for in-series pumping and parallel pumping relates to adaptive prediction of FDPDP intake hydraulic resistance required to regulate inlet pressure. For example:

| | |
|---|---|
| Fill choke Cv value: | Cvf |
| Mud inlet flow rate: | $Q_{mud}$ |
| Pump inlet gauge pressure: | $P_{inlet}$ |
| Governing equation: | $Q = Cvf \cdot \sqrt{\Delta P}/\sqrt{S.G.}$ |
| Time between readings: | $\Delta t$ |
| Time step numbers: | n, n + 1, etc. |
| Fill choke Cv at a given time: | $Cvf_n$ |
| Target fill choke Cv: | $Cvf_{n+1}$ |
| Target inlet gauge pressure: | $P_{target}$ |

To determine the target Cvf to change FDPDP inlet pressure from $P_{inlet}$ to $P_{target}$:

Assume $\Delta t$ is small enough that $Q_{mud\ n} \approx Q_{mud\ n+1}$; i.e., there is no significant change in flow rate between readings.

The governing equation is therefore: $Q_{mud} = Cvf_n \cdot \sqrt{P_{inlet}}/\sqrt{S.G.} = Cvf_{n+1} \cdot \sqrt{P_{target}}/\sqrt{S.G.}$ Thus, the next fill choke Cvf prediction is: $Cvf_{n+1} = Cvf_n \cdot \sqrt{P_{inlet}}/\sqrt{P_{target}}$ In some embodiments, flow Q in fact changes over time; however, the sampling rate is high enough that there is no significant change in flow rate between readings.

The adaptive prediction converges very quickly. The pump inlet pressure is regulated independently from the flow rate. The method is tolerant to choke actuator offset error. Choke position can be used instead of Cvf curve with acceptable iteration delay. Advantageously, there is no need for a PID calculation method, and therefore nothing to tune, thus the method is greatly simplified over known control methods.

In one embodiment, a control method suitable for in-series pumping and parallel pumping relates to adaptive prediction of FDPDP intake hydraulic resistance required to regulate pump inlet flow rate. For example:

| | |
|---|---|
| Fill choke Cv value: | Cvf |
| Mud inlet flow rate: | Q |
| Pump inlet gauge pressure: | $P_{inlet}$ |
| Governing equation: | $Q = Cvf \cdot \sqrt{\Delta P}/\sqrt{S.G.}$ |
| Time between readings: | $\Delta t$ |
| Time step numbers: | n, n + 1, etc. |
| Target fill choke Cv: | $Cvf_{n+1}$ |
| Target inlet gauge pressure: | $Q_{target}$ |

Determine the target Cvf to change FDPDP inlet pressure from Q to $Q_{target}$:

Assume $\Delta t$ is small enough that $\sqrt{P_{inlet\ n}} \approx \sqrt{P_{inlet\ n+1}}$ no significant change in square root of inlet pressure between readings.

Implementing the equation: $\sqrt{P_{inlet}} = \sqrt{S.G.} \cdot Q_n/Cvf_n = \sqrt{S.G.} \cdot Q_{target}/CVf_{n+1}$ Next fill choke Cv prediction: $Cvf_{n+1} = Cvf_n \cdot Q_{target}/Q_n$ In some embodiments, $P_{inlet}$ changes over time; however, the sampling rate is high enough that there is no significant change in pump inlet pressure between readings.

The adaptive prediction converges very quickly. The pump inlet flow rate is regulated independently from the pump inlet pressure. The method is tolerant to choke actuator offset error. Choke position can be used instead of Cvf curve with acceptable iteration delay. Advantageously, there is no need for a PID calculation method, nothing to tune, thus the method is simple.

Some embodiments of the present disclosure can be referred to as "time domain flow control" (TDFC) methods. Unlike non-adaptive previous FDPDP control methods described in the Background, TDFC methods continuously set a target sequence duration, also referred to herein as "dt," for each time step or sequence step in a complete cycle based on the FDPDP inlet pressure or flow rate. Thus, the TDFC methods are advantageously adaptive. In embodiments using TDFC methods, a target sequence duration (dt) is determined or calculated by a controller 19. Thus, the pumping process will be controlled to reach a given target volume level and target time. The same target sequence duration (dt) is used simultaneously by the controller for filling and pumping steps, thus synchronizing the pump operations. The target sequence duration (dt) also conveys a feedforward control role between filling and pumping. Unlike previous FDPDP control methods, in TDFC methods, when either filling or pumping sequence reaches its own volume target (i.e., maximum or minimum volume target), a global end of sequence is triggered. In this way, TDFC methods synchronize processes or sequences, even for parallel running FDPDPs.

In some embodiments, the driving fluid, e.g., seawater, is used to drive the pumping process. Excess fluid can be discharged to the ocean environment via the dump choke. In one embodiment, a method to determine how much excess fluid needs to be discharged to keep the steady balance between the mud and the driving fluid (seawater) inside of the FDPDP 25 is provided. Unlike previous FDPDP control methods which attempted to balance all mud and driving fluid (seawater) in the FDPDP 25, the control method does not consider inactive chambers, but only focuses on actively filling and pumping chambers on the mud side of the pump. It has been found that considering inactive chambers and hysteresis of the bladder position (e.g., deadband in LVDT reading) result in oscillating, over reactive control values which badly affect the control system. In TDFC, it is easy to determine whether a pumping process is behind or ahead of a filling process, since the starting and finish times and volumes are all known. Thus, the control system is more stable than known control methods.

Figure 2:
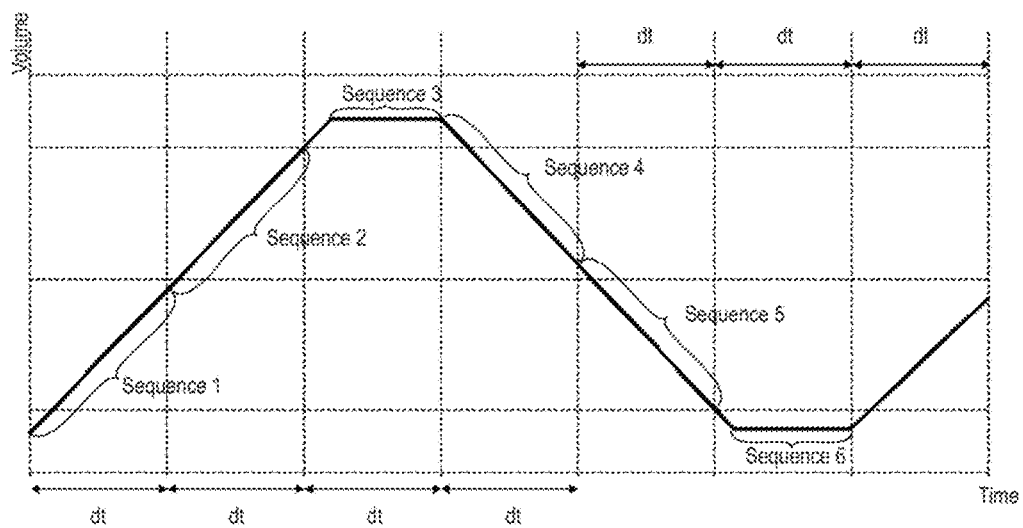
FIG. 2 shows the filling, transfer and pumping sequences of drilling fluid levels plotted by time for example embodiments for a single FDPDP chamber of a vessel.

There are six discrete sequences of a complete cycle for TDFC as shown in FIG. 2: Sequence 1 (Filling Starts), Sequence 2 (Filling Ends), Sequence 3 (Fill to Pump Transfer), Sequence 4 (Pumping Starts), Sequence 5 (Pumping Ends) and Sequence 6 (Pump to Fill Transfer).

The "Fill Sequence" (Sequences 1 and 2) can be defined as the period from the time the pumped fluid (mud) starts filling into an actively filling chamber of a vessel to the time the mud stops filling into the chamber. In this sequence, at the start, the chamber is filled with driving fluid (seawater). The membrane is at a "minimum" position close to the bottom of the vessel. The mud is allowed to flow into the chamber. While the mud is filling into the chamber, the driving fluid is allowed to flow out of the chamber on the other side of the membrane in the same vessel. By the end of the sequence, the chamber is filled with mud and the membrane is at a "maximum" position close to the top of the vessel.

The "Transfer from Fill to Pump Sequence," also referred to as "Hold" or "Transfer," (Sequence 3) can be defined as the period from the time mud is stopped from filling into the chamber to the time mud begins to leave the chamber. In this sequence the chamber is filled with mud. The membrane stays at maximum position close to the top of the chamber. All valves close, and at the end of the period valves open to pump mud with the help of the driving fluid.

The "Pump Sequence" (Sequences 4 and 5) can be defined as the period from the time mud starts flowing out of the chamber to the time mud stops flowing out of the chamber. In this sequence, at start, the chamber is filled with mud and the membrane is at the maximum position in the vessel. The driving fluid is allowed to flow into the chamber on the other side of the membrane. While the driving fluid is filling into the chamber on the other side of the membrane, the mud is allowed to flow out of the chamber. At the end of the sequence the chamber is filled with driving fluid and the membrane is at the minimum position of the vessel.

The "Transfer from Pump to Fill Sequence," also referred to as "Hold" or "Transfer," (Sequence 6) can be defined as the period from the time mud stops leaving a given chamber to the time mud starts actively filling the chamber (i.e., Sequence 1). In this sequence the chamber is filled with the driving fluid. The membrane stays at the minimum position. All valves close, and at the end of the period valves open to allow the chamber to fill with mud.

Figure 3:
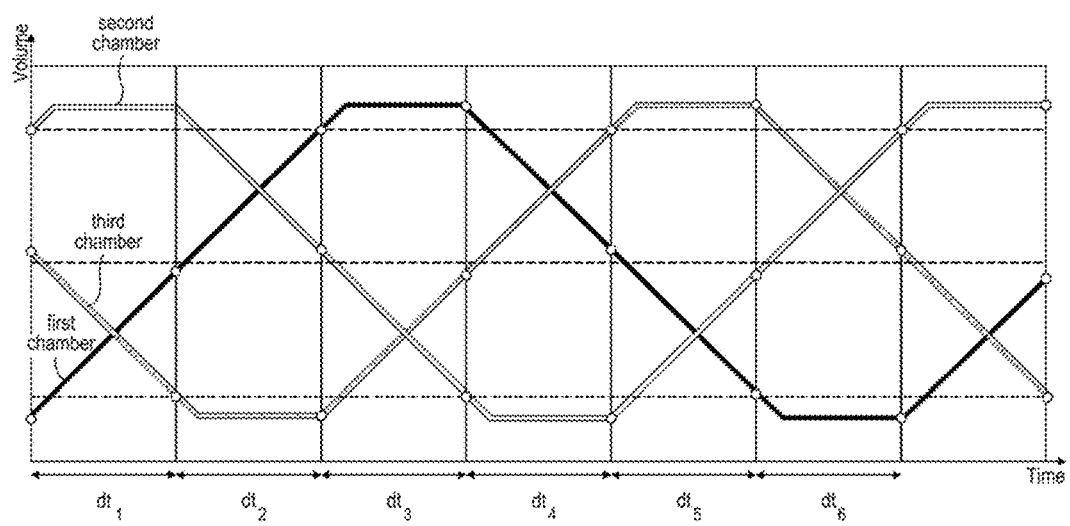
FIG. 3 shows the filling, transfer and pumping sequences of drilling fluid levels plotted by time for example embodiments for a triplex FDPDP.

FIG. 3 shows the filling, transfer and pumping sequences of drilling fluid levels plotted by time for example embodiments for a triplex FDPDP 25, i.e., a pump having three vessels 5. The plot shows the volume of mud in each of the three mud side chambers 5a of the FDPDP 25. As can be seen, the filling, transfer and pumping sequence of each mud side chamber 5a of each vessel 5 is offset by 120° from that of the prior mud side chamber 5a. Regardless of the number of vessels (3 or more), at any given time, one chamber 5a will be filling, also referred to as actively filling, with mud (Sequence 1 and Sequence 2); one chamber will be transferring from filling with mud to pumping mud (Sequence 3) or from pumping mud to filling with mud (Sequence 6); and one chamber will be actively pumping mud (Sequence 4 and Sequence 5).

Figure 4:
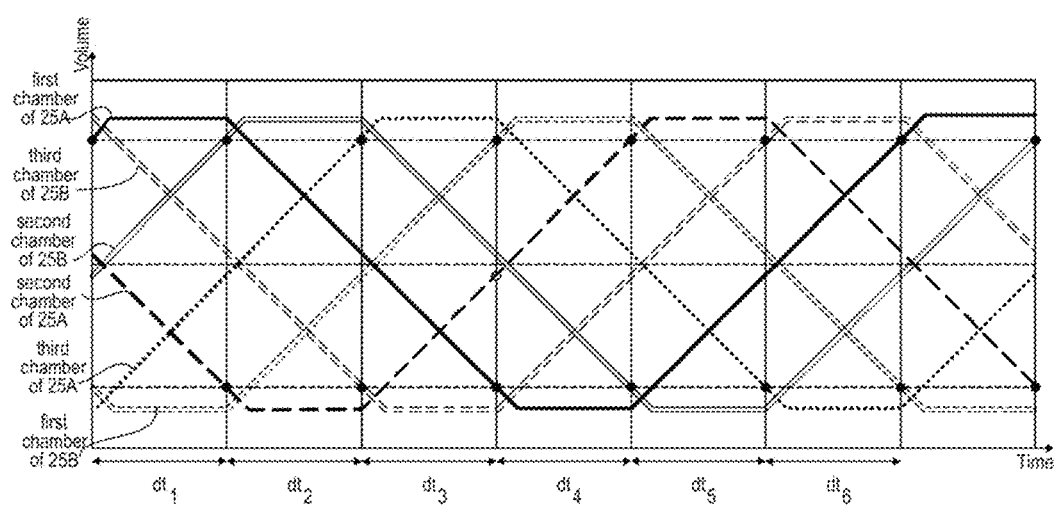
FIG. 4 shows the filling, transfer and pumping sequences of drilling fluid levels plotted by time for example embodiments for two triplex FDPDPs in parallel.

FIG. 4 shows the filling, transfer and pumping sequences of drilling fluid levels plotted by time for example embodiments for two triplex FDPDPs 25 in parallel, i.e., two pumps 25A and 25B having three vessels 5 each. Each vessel 5 has two chambers 5a and 5b separated by a membrane 5c. As can be seen, the filling, transfer and pumping sequence of each mud side chamber 5a is offset by 60° from that of the prior mud side chamber 5a.

There are several requirements that the FDPDP should fulfill for successful deepwater operation. The pump inlet pressure should be kept at given pressure and within given range. Even though the pressure is varied based on the mud characteristics, drill string length/depth, mud flow path geometry, water depth, drilling method and mud flow rate, the pressure range can be as narrow as ±10 psi.

Stable FDPDP operation at any given inlet pressure, mud weight, water depth and flow rate within FDPDP operation envelop requires the FDPDP fill and pump cycles to be controlled such that there is always enough time to transfer filling or pumping from an active chamber to a next chamber for flow continuity. Since the pumping cycle transients affect the FDPDP stability, the discharge pressure transients should be minimized as much as possible.

In one embodiment, a control method suitable for in-series pumping and parallel pumping relates to adaptive prediction of sequence duration dt to regulate pump inlet pressure or pump inlet flow rate. The method controls a FDPDP 25 on a seafloor in a subsea mudlift drilling operation by regulating a pump fill sequence.

A fill volume $Vf_n$ of drilling fluid within each of the mud side chambers 5a of the pressure vessels 5 of FDPDP 25 that is actively filling is monitored via the at least one diaphragm location sensor 20 also referred to as the linear variable differential transformer (LVDT) (or piston location sensor) during the subsea fluid driven positive displacement drilling operation, such that periodic $Vf_n$ measurements are measured every n unit of time.

Equation $Vf_{target}=Vf_{mid}-(Vf_{min}-Vf_{start})/2$ is solved for a target fill volume wherein:

$Vf_{target}$ is the target fill volume of drilling fluid within the actively filling chamber 5a of the pressure vessels 5, $Vf_{mid}$ and $Vf_{min}$ are known for each actively filling chamber 5a of pressure vessel 5, and $Vf_{start}$ is a starting fill volume of drilling fluid within each actively filling chamber 5a of the pressure vessels 5 as measured by the at least one LVDT 20.

Equation $dt=(Vf_{target}-Vf_{start})\times(t_n-t_{n-1})/(Vf_n-Vf_{n-1})$ is next solved for dt using the calculated $Vf_{target}$, $Vf_{start}$, and periodic $Vf_n$ and $Vf_{n-1}$ measurements and associated time values $t_n$ and $t_{n-1}$, respectively. dt represents approximately the duration of ⅙ of a complete fill-transfer-pump-transfer cycle of each mud side chamber 5a of a pressure vessel 5. In theory, dt is approximately ½ the duration of the active filling of one mud side chamber 5a.

The opening and closing of the first and second valves 7 and 8, respectively, for controlling the flow of drilling fluid into and out of the mud side chamber 5a of each pressure vessel 5 and the opening and closing of the first and second valves 9 and 10, respectively, for controlling flow of seawater into and out of the second (seawater side) chamber 5b of each pressure vessel 5 are sequenced based on the calculated dt to fill the first (mud side) chamber 5a that is being actively filled at a given time. In embodiments having a single triplex pump 25, there will only be one mud side chamber 5a being actively filled with mud at a given time. The first chamber 5a of each pressure vessel 5 fills for approximately 2×dt, transfers from filling to pumping for approximately 1×dt, pumps out for approximately 2×dt and transfers from pumping to filling for approximately 1×dt in the complete fill-transfer-pump-transfer cycle, assuming constant flow rate. Thus, precise fill volume control can advantageously be achieved without the use of a PID calculation method.

The equations $Vf_{target}=Vf_{mid}-(Vf_{min}-Vf_{start})/2$ and $dt=(Vf_{target}-Vf_{start})\times(t_n-t_{n-1})/(Vf_n-Vf_{n-1})$ can be solved by any known means for solving equations, including a computer processor and a calculator.

Any known means can be used for opening and closing the first and second valves 7 and 8, respectively, for controlling flow of drilling fluid into and out of the first chamber 5a of each pressure vessel 5 and the first and second valves 9 and 10, respectively, for controlling flow of seawater into and out of the second chamber 5b of each pressure vessel 5 based on the calculated dt to fill and pump out the first chamber 5a of each pressure vessel 5. For example, the valves 7, 8, 9 and 10 can be controlled by directional control valves (not shown) that are controlled by solenoid valves (not shown) electrically connected to the valves for opening and closing the valves. The solenoid valves are connected to a FDPDP computer and receive signals therefrom via a driver board. The directional control valves are further hydraulically connected to a hydraulic power unit (HPU) (not shown) by a supply line (not shown) and a return line (not shown). The HPU can include a hydraulic reservoir, a pressure sensor and an accumulator.

Figure 5:
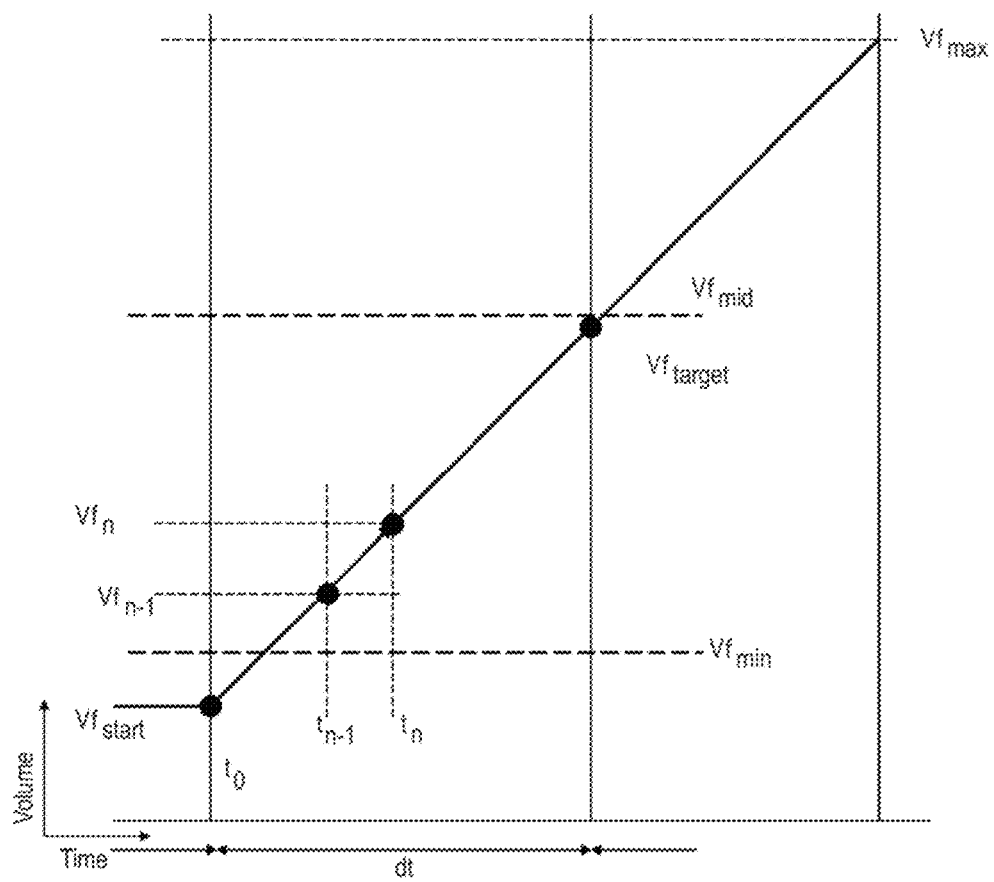
FIGS. 5-8 show individual increments of time from the plot of FIG. 3 to illustrate example methods.

To illustrate, "dt" sequence duration can be determined for Sequence 1 as follows. In this case, the sequence duration for Sequence 1 is also referred to as $dt_1$. Referring to FIG. 5, shown is a portion of the volume-time plot in which a chamber is beginning to fill (Sequence 1) where:

| | |
|---|---|
| Minimum Fill Volume trigger point: | $Vf_{min}$ |
| Maximum Fill Volume trigger point: | $Vf_{max}$ |
| Middle Fill Volume of the Chamber: | $Vf_{mid}$ |
| Starting Fill Volume: | $Vf_{start}$ |
| Target Fill Volume: | $Vf_{target}$ |
| Mud Fill Volume Reading: | $Vf_n$ |
| Previous Mud Fill Volume Reading: | $Vf_{n-1}$ |
| Volume Reading Time: | $t_n$ |
| Previous Volume Reading Time: | $t_{n-1}$ |
| Sequence Start Time: | $t_0$ |
| Sequence Duration: | $dt_1$ |

First, the Target Fill Volume $Vf_{target}$ is determined from the equation below for Sequence 1:

$$Vf_{target} = Vf_{mid} + (Vf_{start} - Vf_{max})/2$$

The sequence duration $dt_1$ can then be determined by a controller from the equation below for Sequence 1:

$$dt_1 = (Vf_{target} - Vf_{start}) \times (t_n - t_{n-1})/(Vf_n - Vf_{n-1})$$

This dt value is thus determined by a controller from the first of two filling sequences for an actively filling mud side chamber, but is conveniently used to control all the activity of the pump for that dt period of time ($dt_1$).

Figure 6:
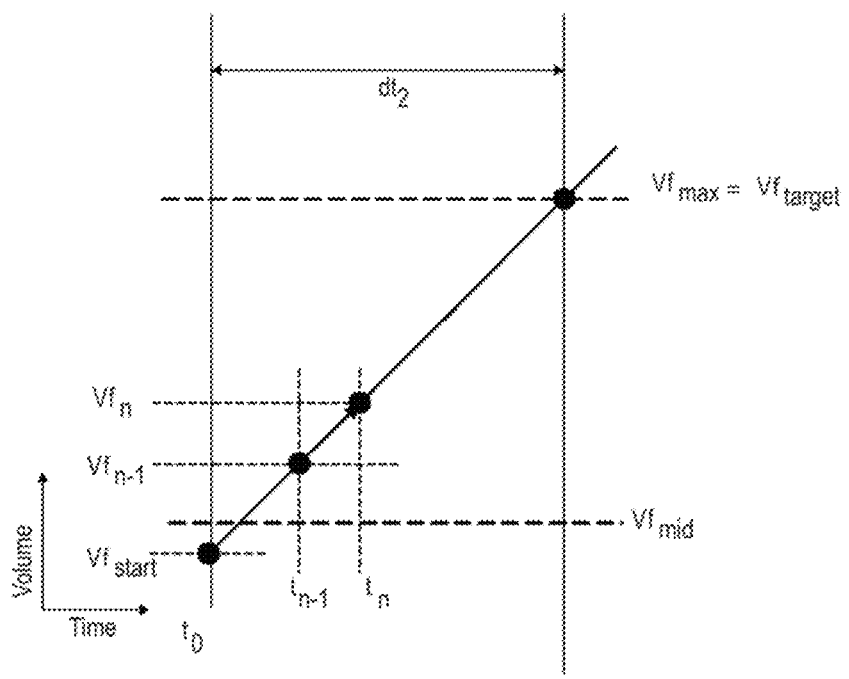

Likewise, the dt sequence duration can be determined by a controller for Sequence 2 (i.e., $dt_2$, the second of two filling sequences for an actively filling chamber) as follows. Referring to FIG. 6:

The Target Fill Volume $Vf_{target}$ can be determined by a controller from the equation below for Sequence 2:

$$Vf_{target} = Vf_{max}$$

The sequence duration $dt_2$ can then be determined by a controller from the equation below for Sequence 2:

$$dt_2 = (Vf_{target} - Vf_{start}) \times (t_n - t_{n-1})/(Vf_n - Vf_{n-1})$$

This dt value is thus determined from the second of two filling sequences for an actively filling mud side chamber, but is used to control all of the activity of the pump for that dt period of time ($dt_2$). Thus, a method for determining an FDPDP fill sequence has been described.

An FDPDP pump sequence and how a pump choke setting Cvp is determined as required to keep up with filling mud will now be described.

Figure 7:
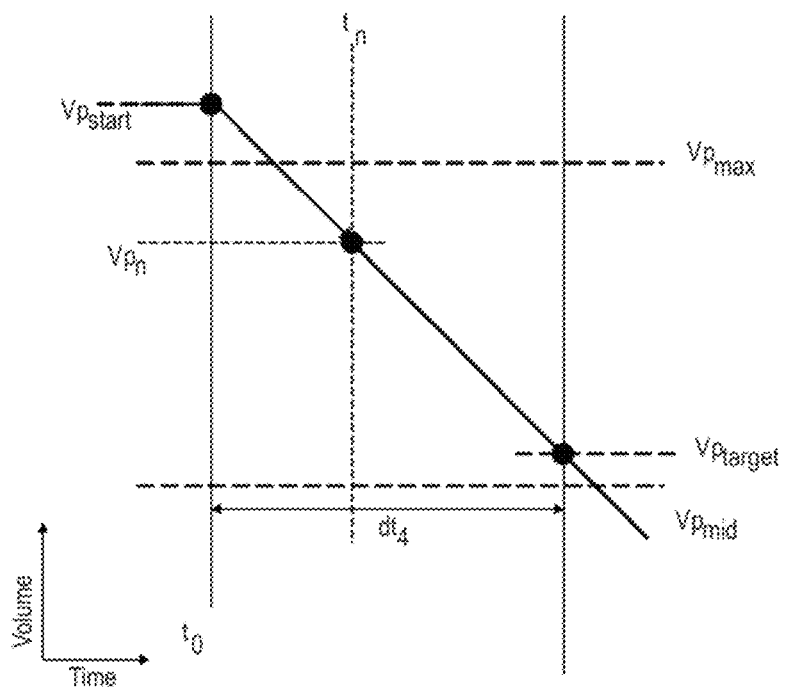

An FDPDP pump choke setting (Cvp), also referred to as a driving fluid hydraulic resistance, can be controlled by a pump choke 22. In one embodiment, a "dt" sequence duration for the start of pumping from a given mud side chamber 5a can be determined for Sequence 4 as follows. The sequence duration dt for Sequence 4 is also referred to as $dt_4$. Referring to FIG. 7, shown is a portion of the volume-time plot in which a chamber is beginning to pump out (Sequence 4) where:

| | |
|---|---|
| Mud Inlet Flow Rate: | $Q_{mud}$ |
| Maximum Pumping Volume: | $Vp_{max}$ |
| Middle Pumping Volume: | $Vp_{mid}$ |
| Starting Pumping Volume: | $Vp_{start}$ |
| Target Pumping Volume: | $Vp_{target}$ |
| Mud Pumping Volume Reading: | $Vp_n$ |
| Volume Reading Time: | $t_n$ |
| Sequence Target Duration, given: | $dt_4$ |

The Target Pumping Volume "$Vp_{target}$" can be determined from the equation below for Sequence 4:

$$Vp_{target} = Vp_{mid} + (Vp_{start} - Vp_{max})/2$$

The Pump Choke Cv value Cvp is determined from the equation below for Sequence 4:

$$Cvp = 60 \cdot (Vp_n - Vp_{target})/[(t_0 + dt_4 - t_n) \cdot \sqrt{vDP}]$$

Where vDP is a desired pumping differential pressure, and vDP is a preset value between 10 psi and a pressure lower than a valves locking differential pressure, e.g., 250 psi.

Figure 8:
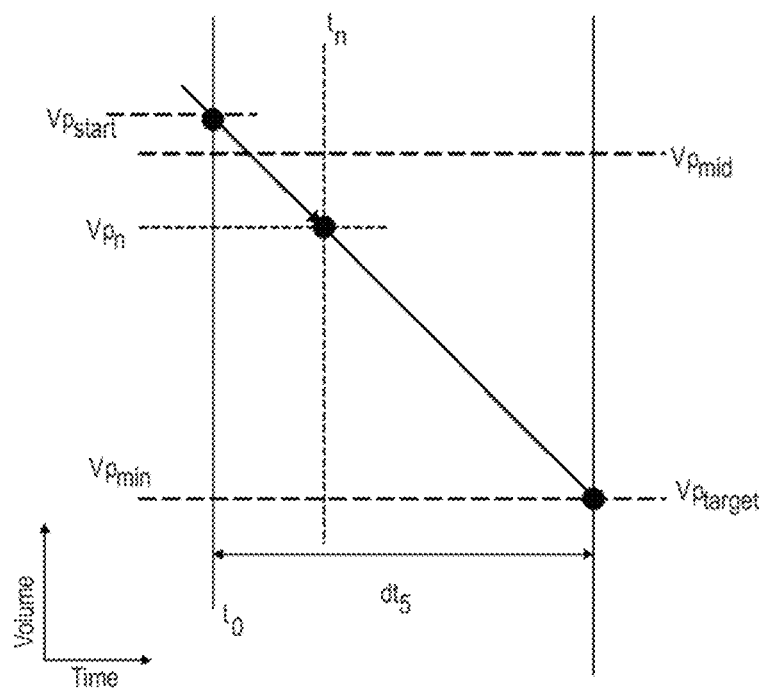

In one embodiment, "dt" sequence duration for the end of pumping can be determined for Sequence 5 (i.e., $dt_5$) as follows. Referring to FIG. 8:

| | |
|---|---|
| Minimum Volume: | $Vp_{min}$ |
| Middle Volume: | $Vp_{mid}$ |
| Starting Volume: | $Vp_{start}$ |
| Target Volume: | $Vp_{target}$ |
| Mud Volume Reading: | $Vp_n$ |
| Volume Reading Time: | $t_n$ |
| Sequence Target Duration, given: | $dt_5$ |

The Target Volume "$Vp_{target}$" can be determined from the equation below for Sequence 5:

$$Vp_{target} = Vp_{min}$$

The Pump Choke Cv Value "Cvp" is determined from the equation below for Sequence 5:

$$Cvp = 60 \cdot (Vp_n - Vp_{target})/[(t_0 + dt_5 - t_n) \cdot \sqrt{vDP}]$$

Referring to FIG. 3, the synchronized filling, transferring and pumping of each of the three vessels are shown. The timescale is divided up into individual durations, dt's, labeled "$dt_1$" through "$dt_6$." Each chamber on the mud side of the three vessels of the FDPDP 25 sequentially fills for approximately two dt's, transfers for approximately one dt, pumps for approximately two dt's, and transfers for approximately one dt before beginning the complete cycle again. The three vessels are staggered to smooth out the disturbances associated with the opening and closing valves. Having greater than three vessels in a FDPDP, or having two or more triplex pumps, provides even greater ability to smooth out the disturbances associated with the opening and closing valves. During the first dt, i.e., $dt_1$, one mud side chamber, referred to as the first chamber, is filling, another mud side chamber, referred to as the second chamber, is transferring, and yet another mud side chamber, referred to as the third chamber, is pumping. The first, second and third chambers are the three mud side chambers of the triplex pump 25.

In one embodiment, using methods described herein, $dt_1$ is calculated from the active filling of the first mud side chamber 5a (i.e., Sequence 1). The calculated $dt_1$ is used to determine the target volume for the third mud side chamber 5a in pumping mode (in Sequence 5) and the target volume for the second mud side chamber 5a in transferring mode (in Sequence 3).

Similarly:

The second dt, i.e., $dt_2$, is calculated using methods described herein from the continued active filling of the first mud side mud side chamber (i.e., Sequence 2). The calculated $dt_2$ is used to determine the target volume for the pumping of the second mud side chamber (in Sequence 4) and the target volume for the end of transferring of the third mud side chamber (in Sequence 6).

The third dt, i.e., $dt_3$, is calculated using methods described herein from the active filling of the third mud side chamber (in Sequence 1). The calculated $dt_3$ is used to determine the target volume for the continued pumping of the second mud side chamber (in Sequence 5) and the target volume for the end of transferring of the first mud side chamber (in Sequence 6).

The fourth dt, i.e., $dt_4$, is calculated using methods described herein from the continued active filling of the third mud side chamber (in Sequence 2). The calculated $dt_4$ is used to determine the target volume for the pumping Sequence 4 of the first mud side chamber, and the target volume for the end of transferring of the second mud side chamber (in Sequence 6).

The fifth dt, i.e., $dt_5$, is calculated from the active filling of the second mud side chamber in Sequence 1. The calculated $dt_5$ is used to determine the target volume for the continued pumping of the first mud side chamber (in Sequence 5) and the target volume for the end of transferring of the third mud side chamber (in Sequence 3).

The sixth dt, i.e., $dt_6$, is calculated from the continued active filling of the second mud side chamber in Sequence 2. The calculated $dt_6$ is used to determine the target for the pumping of the third mud side chamber (in Sequence 4) and the target volume for the end of transferring of the first mud side chamber (in Sequence 6).

The complete cycle of dt's (the six sequences) will then repeat from $dt_1$.

Advantageously, the six sequences for controlling all the mud volume levels of the three vessels (mud side chambers) are synchronized based on a single calculated dt at all times. Thus, all the mud side chambers' target volumes are set based on sequence 1 or sequence 2. Synchronization of the chambers is thus greatly simplified.

During the filling sequence "dt" is determined. This "dt" is used to determine a pump choke setting Cvp, also referred to as a driving fluid hydraulic resistance, required to keep up with the filling mud. A pumping chamber mud flow rate is controlled by the pump choke value Cvp, which is mainly calculated by the desired pumping pressure (vDP) and Sequence Target Duration (dt). Filling and pumping sequences may not be perfectly synchronized; there is a possibility that the actual pumping pressure is higher or lower than the desired value, or the pump choke (Cvp) actual value can be different than recommended value. Therefore, it is needed to determine how many gallons' mud error exists between filling and pumping sequences. Once the error is known, it is possible to control the dump choke value Cvd to compensate for the mud volume error. The "Mud Volume Error" (eVp) is a numeric value that represents the amount of mud volume error in a pumping chamber compared to a filling chamber, i.e., the discrepancy in the volumes. The Mud Volume Error (eVp) can be determined from the equation below:

$$eVp = Vp_{start} - Vp_n - (Vf_n - Vf_{start}) \cdot (Vp_{start} - Vp_{target}) / (Vf_{target} - Vf_{start})$$

The pump choke value (Cvp) controls the driving fluid (seawater) pressure and the pumping differential pressure (vDP). While the pump choke works to keep the pumping differential pressure (vDP) at the desired level for a given flow rate, the dump choke (having a dump choke value Cvd) works to minimize the Mud Volume Error (eVp). Thus, the pumped fluid (mud) and the driving fluid (seawater) volumes can be balanced.

In some embodiments, the dump choke value Cvd can be iteratively calculated using a standard proportional-integral-derivative (PID) calculation method. The PID response is tuned based on system behavior. The Mud Volume Error (eVp) is fed to the PID. A processor then updates dump choke value Cvd iteratively as follows. The iterations are for every n unit of time (Δt) when the inlet pressure $P_{inlet}$ is measured, e.g., every 10-50 ms.

$$Cvd_n = Cvd_{n-1} + PID(eVp_n)$$

Figure 9:
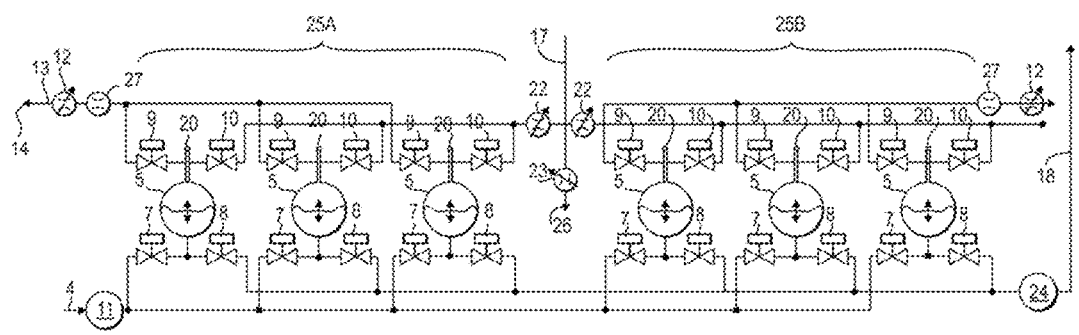
FIG. 9 shows a schematic diagram of a field system having two triplex FDPDPs in which example embodiments can be applied.

In some embodiments, two or more FDPDPs 25, designated pumps 25A and 25B, can be configured to operate in parallel, as shown in FIG. 9. A method is provided of synchronizing the filling and pumping sequences of the pumps. As described above, per filling equation, each pump will generate its own "dt" for any given time (e.g., $dt_1(A)$, $dt_1(B)$ for a system having pumps 25A and 25B. The pumps are synchronized to have a single "dt" by averaging the individual pump dt's, so that:

$$dt_n = (dt_n(A) + dt_n(B))/2, \text{ where } n \text{ is the Sequence number.}$$

In this way, both pumps 25A and 25B will be aiming for one "dt" target, therefore they will be synchronized.

Once the common "dt" is established between the pumps, the inlet mud flowrates need to be adjusted to balance the inlet mud flowrates. Each pump's flow restriction (i.e., fill choke values $Cvf_A$, $Cvf_B$) should be adjusted. The flowrate balance restriction ($Cvf_x$) can be calculated for each pump's fill restriction ($Cvf_A$, $Cvf_B$) from the equations below.

$$Cvf_A = Cvf + Cvf_x$$

$$Cvf_B = Cvf - Cvf_x$$

$$Cvf_x = [(Vf_{target} - Vf_{1n}) - (Vf_{target} - Vf_{2n})] / [120 \cdot (t_0 + dt - t_n) \cdot \sqrt{P_{inlet}}]$$

When two FDPDPs 25A and 25B are configured to operate in parallel, two pump sequences are coupled in such a way that the second pump is always one sequence ahead of the first pump, where each sequence is 60°. Therefore, when pump 25A is in Sequence 1, pump 25B is in Sequence 2. By running two pumps in parallel and one sequence (i.e., one "dt") off, the pressure transients due to valve movements of one pump will be absorbed by the other pump and vice versa, therefore the pumps' inlet and outlet pressure transients can advantageously be minimized.

In some embodiments, a method of adaptive prediction of hydraulic resistance required to balance mud volume and driving fluid volume is provided for a system having two FDPDPs 25A and 25B operating in parallel. The driving fluid (seawater) pressure, also referred to as driving fluid pumping differential pressures ($vDP_A$ and $vDP_B$) are respectively controlled by the pump chokes $Cvp_A$ and $Cvp_B$. While the pump chokes are working to keep the pumping differential pressure (vDP) in a desired level per the pumps' flow rates, the dump choke (Cvd) is working to minimize the total Mud Volume Error (eVp) of the system, as defined herein. Thus, the volumes of the pumped fluid (mud) and the driving fluid (seawater) in the total pump system are advantageously balanced. The dump choke value Cvd is iteratively calculated by using a standard proportional-integral-derivative (PID) calculation method from the total Mud Volume Error ($eVp_A + eVp_B$) as follows:

$$Cvd_n = Cvd_{n-1} + PID(eVp_{An} + eVp_{Bn})$$

In some embodiments, a single controller 19 is used in the methods disclosed herein. The control methods of the present disclosure can be categorized into control methods suitable for in-series pumping (pumps having three or more vessels), control methods suitable for parallel pumping (two or more sets of in-series pumps in parallel) and control methods suitable for in-series pumping and parallel pumping. Controller 19 controls or regulates the operation of a machine. A processor in the controller 19 executes a program. Electrical connections are not shown between system components and controller 19.

The controller 19 can control the following operations, among others: reading the pressure value from sensor 11 and controlling the Cv value of choke 12; reading the flowrate Q value from flowmeter 27 and controlling the Cv value of choke 22; reading level values from LVDTs 20, controlling the Cv value of choke 23, calculating dt targets for the sequence durations, and then controlling valves 7A, 8A, 9A, 10A, 7B, 8B, 9B, 10B, 7C, 8C, 9C and 10C; and ensuring the driving fluid (seawater) pump 16 flowrate is always higher than pumped fluid (mud) pump 15 flowrate (e.g., nominally 300 gpm or higher).

The embodiments disclosed improve subsea FDPDP performance, reliability and robustness by implementing a number of new control methods. Each control method can be used to alter other subsea fluid driven positive displacement control schemes to improve overall pumping performance. It should be noted that only the components relevant to the disclosure are shown in the figures, and that many other components normally part of a subsea fluid driven positive displacement pump system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for controlling a subsea fluid driven positive displacement pump in a subsea pumping operation by regulating a pump inlet pressure or a pump inlet flow rate, the method comprising:
   a. providing in a subsea environment at least one fluid driven positive displacement pump comprising:
      i. a plurality of pressure vessels connected in parallel wherein each pressure vessel has a first and a second chamber separated by a diaphragm or a piston therein and wherein the first chamber of each pressure vessel is connected to a source of fluid to be pumped from a first location to a second location;
      ii. a pump inlet conduit connecting the first chamber of each of the pressure vessels to the source of fluid to be pumped;
      iii. a first and a second valve for controlling flow of the fluid to be pumped into and out of the first chamber of each pressure vessel, respectively, wherein the first valve is located in the pump inlet conduit between the first chamber and the source of fluid and the second valve is located in a conduit between the first chamber and the second location;
      iv. a third and a fourth valve for controlling flow of a driving fluid into and out of the second chamber of each pressure vessel, respectively, wherein the third valve is located in a first driving fluid conduit between the second chamber and a driving fluid outlet and the fourth valve is located in a second driving fluid conduit between the second chamber and a driving fluid pump;
      v. at least one sensor coupled to each of the pressure vessels selected from one of a pressure transducer coupled to the pump inlet conduit for monitoring pump inlet pressure and a flow meter for determining a pump inlet flow rate of the fluid to be pumped to the pressure vessels; and
      vi. at least one fill choke having a fill choke position wherein the at least one fill choke is located in the first driving fluid conduit between the third valve for controlling flow of the driving fluid into and out of the second chamber of each pressure vessel and the driving fluid outlet;
   b. monitoring the pump inlet pressure and/or the pump inlet flow rate of the fluid to be pumped to the pressure vessels via the at least one sensor during the subsea pumping operation;
   c. solving a form of a basic liquid flow control equation $Q=Cvf\times\sqrt{(\Delta P/S.G.)}$ for a target flow coefficient Cvf of the at least one fill choke using periodic measurements by the at least one sensor; wherein Q is a flow of the fluid to be pumped through the pump inlet conduit, $\Delta P$ is a differential pressure across the at least one fill choke, and S.G. is a specific gravity of the driving fluid; and wherein Q is assumed to be substantially constant between successive measurements taken by the at least one sensor; and
   d. adjusting the fill choke position to achieve the target flow coefficient Cvf, thereby regulating the pump inlet pressure or the pump inlet flow rate of the fluid to be pumped to the pressure vessels through the pump inlet conduit.

2. The method of claim 1, wherein the at least one sensor coupled to each of the pressure vessels is at least one pressure transducer coupled to the pump inlet for monitoring pump inlet pressure; and the basic liquid flow control equation is in the form $Cvf=Cvf_n\times\sqrt{P_{inlet}}/\sqrt{P_{target}}$ for Cvf wherein $P_{target}$ is given; $Cvf_n$ is read from the at least one fill choke; $P_{inlet}$ is measured periodically by the at least one pressure transducer; and modifying the fill choke position based on the solved Cvf, thereby regulating the pump inlet pressure.

3. The method of claim 1, wherein the at least one sensor coupled to each of the pressure vessels is at least one a diaphragm or piston location sensor for determining a volume of the fluid to be pumped within the pressure vessels; and the basic liquid flow control equation is in the form $Cvf=Cvf_n\times Q_{target}/Q_n$ for Cvf wherein $Q_{target}$ is given; $Cvf_n$ is read from the at least one fill choke; $Q_n$ is measured periodically by at least one flow meter; and modifying the fill choke position based on the solved Cvf, thereby regulating the pump inlet flow rate.

4. A method for controlling a fluid driven positive displacement pump in a subsea pumping operation by regulating a pump fill sequence, the method comprising:
   a. providing in a subsea environment at least one fluid driven positive displacement pump comprising:
      i. a plurality of pressure vessels connected in parallel wherein each pressure vessel has a first and a second chamber separated by a diaphragm or a piston therein and wherein the first chamber of each pressure vessel is connected to a source of fluid to be pumped from a first location to a second location;

ii. a pump inlet conduit connecting the first chamber of each of the pressure vessels to the source of fluid to be pumped;

iii. a first and a second valve for controlling flow of the fluid into and out of the first chamber of each pressure vessel, respectively, wherein the first valve is located in a pump inlet conduit between the first chamber and the source of fluid to be pumped and the second valve is located in a conduit between the first chamber and the second location and wherein one first chamber of one of the plurality of pressure vessels is actively filling with the fluid to be pumped at a given time;

iv. a third and a fourth valve for controlling flow of a driving fluid into and out of the second chamber of each pressure vessel, respectively, wherein the third valve is located in a first driving fluid conduit between the second chamber and a driving fluid outlet and the fourth valve is located in a second driving fluid conduit between the second chamber and a driving fluid pump; and v. at least one diaphragm or piston location sensor for determining a fill volume of the fluid to be pumped within each of the pressure vessels; and b. monitoring a fill volume $Vf_n$ of the fluid to be pumped within the actively filling first chamber at the given time via the at least one diaphragm or piston location sensor during the subsea fluid driven positive displacement drilling operation such that $Vf_n$ measurements are made every user-defined period of time;

c. solving an equation $Vf_{target}=Vf_{mid}-(Vf_{min}-Vf_{start})/2$ for a target volume $Vf_{target}$ of the fluid to be pumped within the actively filling first chamber, wherein $Vf_{mid}$ and $Vf_{min}$ are known for the actively filling first chamber and $Vf_{start}$ is a starting fill volume of the fluid to be pumped within the actively filling first chamber as measured by the at least one diaphragm or piston location sensor at the given time;

d. solving an equation $dt=(Vf_{target}-Vf_{start})\times(t_n-t_{n-1})/(Vf_n-Vf_{n-1})$ for dt using calculated $Vf_{target}$, $Vf_{start}$, and periodic $Vf_n$ and $Vf_{n-1}$ measurements and associated time values $t_n$ and $t_{n-1}$, respectively, wherein dt represents the duration of 1/6 of a complete cycle including (1) starting to fill, (2) finishing filling, (3) transferring from filling to pumping, (4) starting to pump, (5) finishing pumping and (6) transferring from pumping to filling for each pressure vessel;

e. sequencing the opening and closing of the first and second valves for controlling flow of the fluid to be pumped into and out of the first chamber of each pressure vessel and the third and fourth valves for controlling flow of the driving fluid into and out of the second chamber of each pressure vessel based on the calculated dt to fill and pump out the first chamber of each pressure vessel; wherein the first chamber of each pressure vessel fills for 2×dt, transfers from filling to pumping for 1×dt, pumps out for 2×dt and transfers from pumping to filling for 1×dt in the complete cycle; thereby providing precise fill volume control without the use of a PID calculation method; and f. after the actively filling first chamber at the given time has finished filling, repeating steps (b) through (e) for a next first chamber in a rotational order in which the first chambers of the plurality of pressure vessels are filled and pumped out such that after filling one first chamber, the next first chamber is filled.

5. The method of claim 4 wherein the user-defined period of time is from 10 ms to 50 ms.

6. The method of claim 1 or 4 wherein the fluid driven positive displacement pump is located on a seafloor at a depth of from 3,000 ft to 15,000 ft.

7. The method of claim 1 or 4 wherein the subsea pumping operation is in a subsea mudlift drilling operation wherein the source of fluid to be pumped is an annulus in a drill pipe, the fluid to be pumped is drilling fluid, the first location is a downhole location, the second location is a surface location, the driving fluid is seawater, and the driving fluid outlet opens to the ocean.

8. The method of claim 1 or 4 wherein the fluid to be pumped is production fluid comprising oil and/or gas, the first location is a downhole location, the second location is a surface location, the driving fluid is seawater, and the driving fluid outlet opens to the ocean.

9. The method of claim 1 or 4 wherein the fluid to be pumped is produced water, the first location is a subsea location, the second location is a downhole location, and the driving fluid is seawater.

10. The method of claim 1 or 4 wherein the subsea pumping operation is in a subsea mining operation wherein the fluid to be pumped is a slurry, the first location is a downhole location, the second location is a surface location, the driving fluid is seawater, and the driving fluid outlet opens to the ocean.

11. A system for controlling a fluid driven positive displacement pump in a subsea pumping operation by regulating a pump inlet pressure or a pump inlet flow rate, comprising:

a. at least one fluid driven positive displacement pump for location in a subsea environment, comprising:

i. a plurality of pressure vessels connected in parallel wherein each pressure vessel has a first and a second chamber separated by a diaphragm or a piston therein and wherein the first chamber of each pressure vessel is connected to a source of fluid to be pumped from a first location to a second location;

ii. a pump inlet conduit connecting the first chamber of each of the pressure vessels to the source of fluid to be pumped;

iii. a first and a second valve for controlling flow of the fluid to be pumped into and out of the first chamber of each pressure vessel, respectively, wherein the first valve is located in a pump inlet conduit between the first chamber and the source of fluid to be pumped and the second valve is located in a conduit between the first chamber and the second location;

iv. a third and a fourth valve for controlling flow of a driving fluid into and out of the second chamber of each pressure vessel, respectively, wherein the third valve is located in a first driving fluid conduit between the second chamber and a driving fluid outlet and the fourth valve is located in a second driving fluid conduit between the second chamber and a driving fluid pump;

v. at least one sensor coupled to each of the pressure vessels selected from one of a pressure transducer coupled to the pump inlet conduit for monitoring pump inlet pressure and a flow meter for determining a pump inlet flow rate of the fluid to be pumped to the pressure vessels; and vi. at least one fill choke having a fill choke position wherein the at least one fill choke is located in the first driving fluid conduit between the third valve for controlling flow of the driving fluid into and out of the second chamber of each pressure vessel and the driving fluid outlet; and b. a controller coupled to the at least one sensor and the at least one fill choke wherein the controller solves a form of a basic liquid flow control equation $Q=Cvf \times \sqrt{(\Delta P/S.G.)}$ for a target flow coefficient Cvf of the at least one fill choke using periodic measurements by the at least one sensor; wherein Q is a flow of the fluid to be pumped through the pump inlet conduit, $\Delta P$ is a differential pressure across the at least one fill choke, and S.G. is a specific gravity of the driving fluid; and wherein Q is assumed to be substantially constant between successive measurements taken by the at least one pressure sensor and modifies the fill choke position based on the solved Cvf, thereby regulating the pump inlet pressure or the pump inlet flow rate of the fluid to be pumped to the pressure vessels through the pump inlet conduit.

12. The system of claim 11, wherein the at least one sensor coupled to each of the pressure vessels is at least one pressure transducer coupled to the pump inlet for monitoring pump inlet pressure; and the basic liquid flow control equation is in the form $Cvf=Cvf_n \times \sqrt{P_{inlet}}/\sqrt{P_{target}}$ for Cvf wherein $P_{target}$ is given; $Cvf_n$ is read from the at least one fill choke; $P_{inlet}$ is measured periodically by the at least one pressure transducer; and modifying the fill choke position based on the solved Cvf, thereby regulating the pump inlet pressure.

13. The system of claim 11, wherein the at least one sensor coupled to each of the pressure vessels is at least one a diaphragm or piston location sensor for determining a volume of the fluid to be pumped within the pressure vessels; and the basic liquid flow control equation is in the form $Cvf=Cvf_n \times Q_{target}/Q_n$ for Cvf wherein $Q_{target}$ is given; $Cvf_n$ is read from the at least one fill choke; $Q_n$ is measured periodically by at least one flow meter; and modifying the fill choke position based on the solved Cvf, thereby regulating the pump inlet flow rate.

14. A system for controlling a fluid driven positive displacement pump in a subsea pumping operation by regulating a pump fill sequence, comprising:

a. at least one fluid driven positive displacement pump for location in a subsea environment, comprising:

i. a plurality of pressure vessels connected in parallel wherein each pressure vessel has a first and a second chamber separated by a diaphragm or a piston therein and wherein the first chamber of each pressure vessel is connected to a source of fluid to be pumped from a first location to a second location;

ii. a pump inlet conduit connecting the first chamber of each of the pressure vessels to the source of fluid to be pumped;

iii. a first and a second valve for controlling flow of the fluid to be pumped into and out of the first chamber of each pressure vessel, respectively, wherein the first valve is located in the pump inlet conduit between the first chamber and the source of fluid to be pumped and the second valve is located in a conduit between the first chamber and the second location and wherein one first chamber of one of the plurality of pressure vessels is actively filling with the fluid to be pumped at a given time;

iv. a third and a fourth valve for controlling flow of a driving fluid into and out of the second chamber of each pressure vessel, respectively, wherein the third valve is located in a first driving fluid conduit between the second chamber and a driving fluid outlet and the fourth valve is located in a second driving fluid conduit between the second chamber and a driving fluid pump; and v. at least one diaphragm or piston location sensor for monitoring a fill volume $Vf_n$ of the fluid to be pumped within the actively filling first chamber at the given time during the subsea pumping operation such that periodic $Vf_n$ measurements are measured every n unit of time;

b. a means for solving an equation $Vf_{target}=Vf_{mid}-(Vf_{min}-Vf_{start})/2$ for a target fill volume $Vf_{target}$ of the fluid to be pumped within the actively filling first chamber, wherein $Vf_{mid}$ and $Vf_{min}$ are known for the actively filling first chamber and $Vf_{start}$ is a starting fill volume of the fluid to be pumped within the actively filling first chamber as measured by the at least one diaphragm or piston location sensor at the given time;

c. a means for solving an equation $dt=(Vf_{target}-Vf_{start}) \times (t_n-t_{n-1})/(Vf_n-Vf_{n-1})$ for dt using calculated $Vf_{target}$, $Vf_{start}$, and periodic $Vf_n$ and $Vf_{n-1}$ measurements and associated time values $t_n$ and $t_{n-1}$, respectively, wherein dt represents the duration of $\frac{1}{6}$ of a complete cycle including (1) starting to fill, (2) finishing filling, (3) transferring from filling to pumping, (4) starting to pump, (5) finishing pumping and (6) transferring from pumping to filling for each pressure vessel; and d. a means for opening and closing the first and second valves for controlling flow of the fluid to be pumped into and out of the first chamber of each pressure vessel and the third and fourth valves for controlling flow of the driving fluid into and out of the second chamber of each pressure vessel based on the calculated dt to fill and pump out the first chamber of each pressure vessel; wherein the first chamber of each pressure vessel fills for 2×dt, holds for 1×dt during transfer from filling to pumping, pumps out for 2×dt and holds for 1×dt during transfer from pumping to filling in a complete fill-transfer-pump-transfer cycle; thereby providing precise fill volume control without the use of a PID calculation method.

15. The system of claim 11 or 14 wherein the fluid driven positive displacement pump is located on a seafloor at a depth of from 3,000 ft to 15,000 ft.

16. The system of claim 11 or 14 wherein the subsea pumping operation is in a subsea mudlift drilling operation wherein the source of fluid to be pumped is an annulus in a drill pipe, the fluid to be pumped is drilling fluid, the first location is a downhole location, the second location is a surface location, the driving fluid is seawater, and the driving fluid outlet opens to the ocean.

17. The system of claim 11 or 14 wherein the fluid to be pumped is production fluid comprising oil and/or gas, the first location is a downhole location, the second location is a surface location, the driving fluid is seawater, and the driving fluid outlet opens to the ocean.

18. The system of claim 11 or 14 wherein the fluid to be pumped is produced water, the first location is a subsea location, the second location is a downhole location, and the driving fluid is seawater.

19. The system of claim 11 or 14 wherein the subsea pumping operation is in a subsea mining operation wherein the fluid to be pumped is a slurry, the first location is a downhole location, the second location is a surface location, the driving fluid is seawater, and the driving fluid outlet opens to the ocean.

* * * * *